United States Patent [19]

Voirin et al.

[11] Patent Number: 4,849,204
[45] Date of Patent: Jul. 18, 1989

[54] CATALYTIC REMOVAL OF HYDROGEN SULFIDES FROM LIQUID SULFUR

[75] Inventors: Robert Voirin, Orthez; André Pepy, Lescar, both of France

[73] Assignee: Societe Nationale Elf Aquitaine (Production), Coubevoie, France

[21] Appl. No.: 171,425

[22] PCT Filed: Jul. 8, 1987

[86] PCT No.: PCT/FR87/00269
§ 371 Date: Mar. 9, 1988
§ 102(e) Date: Mar. 9, 1988

[87] PCT Pub. No.: WO88/00571
PCT Pub. Date: Jan. 28, 1988

[30] Foreign Application Priority Data

Jul. 10, 1986 [FR] France ................... 86 10062

[51] Int. Cl.$^4$ ............... C01B 17/027; C01B 17/16; C01B 17/18
[52] U.S. Cl. .................... 423/578 R; 423/578 A; 423/564
[58] Field of Search ............. 423/578 R, 578 A, 564

[56] References Cited

U.S. PATENT DOCUMENTS

| 1,497,649 | 6/1924 | Marx | 423/578 |
| 3,447,903 | 6/1969 | Wiewiorowski | 423/578 |
| 3,978,137 | 8/1976 | Frame | 208/207 |
| 4,243,648 | 1/1981 | Fenton | 423/578 R |

FOREIGN PATENT DOCUMENTS 1433822 4/1976 United Kingdom ........... 423/578 R

OTHER PUBLICATIONS

Lagas, J. A., "Stop Emission from Liquid Sulfur", Environmental Management, pp. 85–89.

Primary Examiner—Robert L. Stoll
Assistant Examiner—Adriana L. Eng
Attorney, Agent, or Firm—Burgess, Ryan & Wayne

[57] ABSTRACT

The invention is a catalytic process for removing $H_2S$ and hydrogen polysulfides from liquid sulfur. The process comprises mixing a heterocyclic compound with the liquid sulfur and removing the hydrogen sulfide from the liquid sulfur by contact with a gas which is inert to the liquid sulfur at the treating temperature.

40 Claims, 1 Drawing Sheet

CATALYTIC REMOVAL OF HYDROGEN SULFIDES FROM LIQUID SULFUR

The invention relates to a process for the quick removal of $H_2S$ present in liquid sulfur in a dissolved state alone or with hydrogen polysulfides. The invention is also concerned with a catalytic system that can be used for carrying out the process.

BACKGROUND OF THE INVENTION

Large quantities of sulfur are produced by the CLAUS process by reacting the hydrogen sulfide originating, for example, from deacidification of natural gases or from treatment of petroleum products with sulfur dioxide formed, for example, by combustion of $H_2S$ or combustion of sulfur or sulfur-containing compounds such as pyrites, according to the reaction:

$$2H_2S + SO_2 \rightleftharpoons 3S + 2H_2O$$

A substantial fraction of the sulfur produced by the CLAUS process is stored in the liquid state in heat-insulated tanks, then transported in liquid form to the places of use by trucks, boats, trains or pipelines. The transportation means is provided with adequate heat-insulating means to permit the sulfur to remain in the liquid state during the transportation.

The liquid sulfur obtained by the CLAUS process always contains, in a dissolved state, a small amount of $H_2S$ and hydrogen polysulfides, also called sulfanes, of the formula $H_2S_x$ wherein x represents a number equal to or higher than 2. The sulfanes slowly decompose to release $H_2S$. The gaseous phase above the liquid sulfur in the storage tank or in the container used for its transportation contains, therefore, a certain proportion of $H_2S$, which, due to its toxicity and to its tendency to spontaneous inflammation, makes the loading and unloading of the containers that serve to transport the liquid sulfur dangerous. In order that these operations can be performed safely, the CLAUS liquid sulfur is generally subjected, prior to storage and transportation, to a degasification treatment whose purpose is to lower the content of free and combined $H_2S$ of the liquid sulfur below a threshold fixed by the practice at 10 ppm.

The total amount of $H_2S$ and of sulfanes in the CLAUS liquid sulfur is generally between 50 and 700 ppm and generally depends on the concentration of $H_2S$ in the gaseous phase above the liquid sulfur and on the temperature of the latter. In addition, the relative proportions of free $H_2S$ and sulfanes dissolved in the liquid sulfur depend also on the temperature of the sulfur.

The process of removal of the $H_2S$ present in the liquid sulfur in free and combined forms includes two phases; a first phase in which the sulfanes are decomposed according to the reaction $H_2S_x \rightarrow H_2S + S_{x-1}$ and a second phase in which the released and simply dissolved $H_2S$ and the light sulfanes are removed from the liquid sulfur.

The decomposition of the sulfanes to $H_2S$ and sulfur is a slow reaction. The rate of removal of the $H_2S$ and sulfanes is limited by the speed of the decomposition reaction.

Most of the processes proposed for removing the free and combined $H_2S$ dissolved in the liquid sulfur, are of the type in which a catalytic system consisting of ammonia or compounds that release ammonia at the liquid sulfur condition or compounds having a basic character in the sense of BRONSTEDT are added to the liquid sulfur. The catalytic system facilitates the decomposition of the sulfanes, the released $H_2S$ being simply dissolved in the sulfur is separated from the liquid sulfur by any method that allows the $H_2S$ dissolved physically to escape from the liquid sulfur or to be transformed in situ into sulfur under the action of an oxidizing gas. In particular, in the process disclosed in EP-0045636, the catalytic system consists of a compound selected from the inorganic compounds of phosphorus, urea, urea derivatives, dithionates, dithionites, thiosulfates, bisulfates, and bisulfites. In the processes described in U.S. Pat. No. 3,364,655, FR No. 2,159,691 and U.S. Pat. No. 4,131,437, ammonia is used as the catalyst and the $H_2S$ released by decomposition of the sulfanes is removed by atomization of the liquid sulfur (U.S. Pat. No. 3,364,655), or stripping with an inert gas (FR No. 2,159,691), or by sweeping the open surface of the liquid sulfur by means of a gas such as water vapor, nitrogen, air or residual gas from a sulfur plant (U.S. Pat. No. 4,131,437). The use of a catalytic system of the type which utilizes ammonia, ammonium salts, amines and other nitrogenous compounds has also been suggested in FR No. 2,185,587 and U.S. Pat. No. 3,447,903 with transformation of the $H_2S$ formed, in situ into sulfur by the action of an oxidizing gas namely, air in the first case and $SO_2$ in the second case, injected into the liquid sulfur.

The above cited processes have the inconvenience of slow reaction rates which hinder carrying out the process continuously at the exit from a sulfur manufacturing process. In effect, the processes disclosed require several hours, for example, at least 2.5 hours when using a catalytic system formed of compounds such as defined in EP-0045636, or at least from 5 to 8 hours when using ammonia as the catalytic system to obtain a liquid sulfur having a content of free and combined $H_2S$ below the level required by the standards.

BRIEF DESCRIPTION OF THE INVENTION

It has now been discovered that by using the basic catalytic system of improved effectiveness of the present invention, it is possible to lower the "total $H_2S$" content; that is, the content of free and combined $H_2S$ of the liquid sulfur below the 10 ppm threshold in shorter treatment times than those disclosed in the cited processes. The catalysts of the invention are easy to use, and do not cause discoloration of the treated sulfur or the formation of deposits.

In the process of the present invention, a catalyst system is added to the liquid sulfur. The catalyst system contains one or more basic compounds and the whole is maintained under conditions adequate for removing the hydrogen sulfide from the liquid sulfur. The catalytic system consists essentially of one or more compounds selected from the group consisting of monocyclic and polycyclic heterocyclic compounds that contain at least one nitrogen heteroatom. The heterocyclic compound can additionally contain other heteroatoms such as sulfur and/or oxygen. The catalytic compounds useful in the present invention are soluble and stable in the liquid sulfur at the temperatures of treatment and have a boiling point above 200° C. at atmospheric pressure.

The monocyclic and polycyclic heterocyclic compounds are preferably aromatic heterocyclic compounds, and most preferably include at least one ring of the benzenic type that contains no substituent linked to the ring.

DETAILED DESCRIPTION OF THE INVENTION

Figure 1:
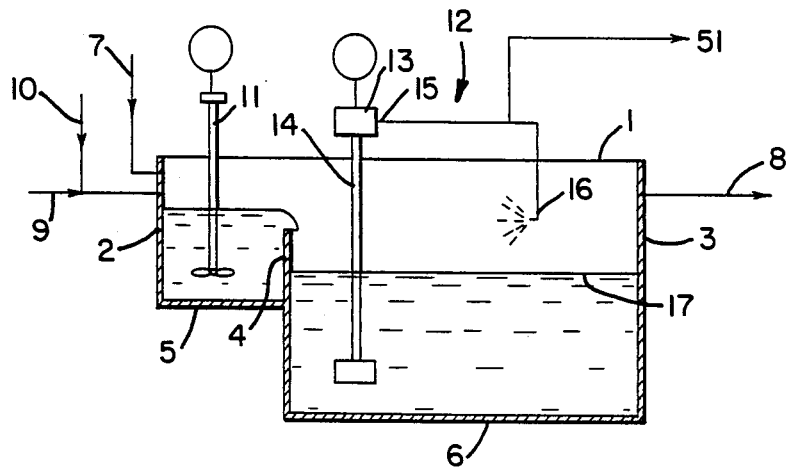
FIG. 1 is a diagrammatic representation of an embodiment of the invention utilizing a mechanical agitation zone and a spray zone.

The heterocyclic compounds useful in the catalytic system of the invention include several heteroatoms comprising at least one nitrogen atom. The heteroatoms can consist exclusively of nitrogen atoms. The preferred compounds comprise heterocyclic polycyclic aromatic compounds with condensed nuclei carrying said heteroatoms, and wherein the heteroatoms are distributed in the cyclic groups so that there is not more than one heteroatom per cyclic group. In the preferred heterocyclic compounds, it is desirable that two similar nitrogen heteroatoms each one being in a different cyclic group are separated by a carbon chain of not more than three carbon atoms.

The phrase "heterocyclic monocyclic compounds" as used herein refers to heterocyclic compounds having any one ring, the ring having at least one heteratom incorporated therein. The heterocyclic monocyclic compounds can have substituents appended to the heterocyclic ring. The phrase "heterocyclic polycyclic compounds" as used herein refers to compounds having two or more cyclic members, which may be attached or fused, in which at least one of the cyclic moieties is a heterocyclic moiety having at least one heteroatom incorporated in the ring. Preferably, two or more of the cyclic moieties are heterocyclic moieties in the polycyclic compounds. The heterocyclic polycyclic compounds can have substituents appended thereto, as long as the substituents do not eliminate the catalytic activity of the compounds.

Examples of heterocyclic compounds that can be used as the catalytic system added to the liquid sulfur in the process of the present invention include quinoline, isoquinoline, benzoquinoline, acridine, benzacridine, quinoxalines, quinazoline, phenazine, phenantridine, phenantrolines, naphthyridines, bipyridyls, and the like.

The amount of catalytic system added to the liquid sulfur must, on one hand, be sufficient to obtain the quick and satisfactory removal of the $H_2S$ and, on the other hand, not increase the amount of ash of the liquid sulfur. The amount of catalytic system added to the liquid sulfur is preferably in the range of about 5 to 120 ppm, based on the weight of the sulfur.

The process according to the invention can be carried out over a broad temperature range above the melting point of sulfur. The process is generally carried out at a temperature from about 125° C. to about 180° C., and preferably from about 130° C. to about 165° C.

The process according to the invention is preferably carried out under conditions that ensure as homogenous as possible, a distribution of the catalytic system in the mass of liquid sulfur and that allows the removal from the liquid sulfur of the hydrogen sulfide released by decomposition of the sulfanes and present in a dissolved state in the liquid sulfur. To ensure distribution of the catalytic system throughout the sulfur, the liquid sulfur containing the catalytic system can be subjected to agitation by any adequate mechanical system of agitation, the released $H_2S$ naturally escaping from the mass of the liquid sulfur. The agitation of the liquid sulfur and the separation of the released $H_2S$ can also be effected by stripping with an inert gas.

According to the invention, an inert gas is a gas which does not react with the constituents of the medium in which it is introduced, under the conditions of temperature selected for carrying out the process. The stripping gas is preferably nitrogen, $CO_2$, air, water vapor, residual gas of a sulfur plant, or mixtures of said gases. The agitation of the liquid sulfur containing the catalytic system and the removal of the released $H_2S$ can be effected by subjecting the liquid sulfur to atomization or spraying, as described in U.S. Pat. No. 3,364,655. The process can also be carried out by using a combination of the different modes of agitation of the liquid sulfur and of removal of the released $H_2S$.

The treatment of the liquid sulfur including one or a combination of the above operations of agitation and gaseous contact is generally carried out in a heat-insulated vessel such as a metal tank or reservoir in which the liquid sulfur is stored. It is preferred that the space above the open surface of the liquid sulfur be swept with an inert gas such as $CO_2$, nitrogen, air, a residual gas of a CLAUS sulfur plant, or the like. The $H_2S$ containing gas is generally passed to an incineration zone. The inert gas sweep facilitates driving the $H_2S$ released by decomposition of the sulfanes away from the mass of liquid sulfur. When the sweeping operation is effected by means of a residual gas from a sulfur plant that is, a gas containing a small amount of $H_2S$, the concentration of $H_2S$ in the residual gas must be controlled. The concentration of $H_2S$ can be controlled by dilution of the residual gas with an inert gas so that the concentration of $H_2S$ is not above, at least toward the end of the operation, the content of gaseous $H_2S$ in equilibrium, at the operation temperature, with the amount of $H_2S$ permitted in the liquid sulfur.

The catalytic system can be added to the liquid sulfur at one time at the beginning of the operation or by portions throughout the operation. When the treatment for removal of $H_2S$ includes mechanical agitation of the liquid sulfur contained in a metal vessel, tank, or reservoir wherein it is stored, the catalytic system can be added with the liquid sulfur entering the vessel that serves for the treatment. If stripping is used for removing the $H_2S$ from the mass of liquid sulfur, the catalytic system can be introduced in the stripping gas and/or added in the liquid sulfur feed to the processing vessel. In the case where atomization or spraying of the liquid sulfur is effected, such spraying generally includes the introduction of the liquid sulfur into a spray nozzle by means of a pump, including a suction conduit that plunges into the liquid sulfur. The catalytic system can be injected into the pump suction or discharge and/or into the feed of liquid sulfur to the processing vessel.

The process according to the present invention can be carried out continuously or batchwise.

Figure 2:
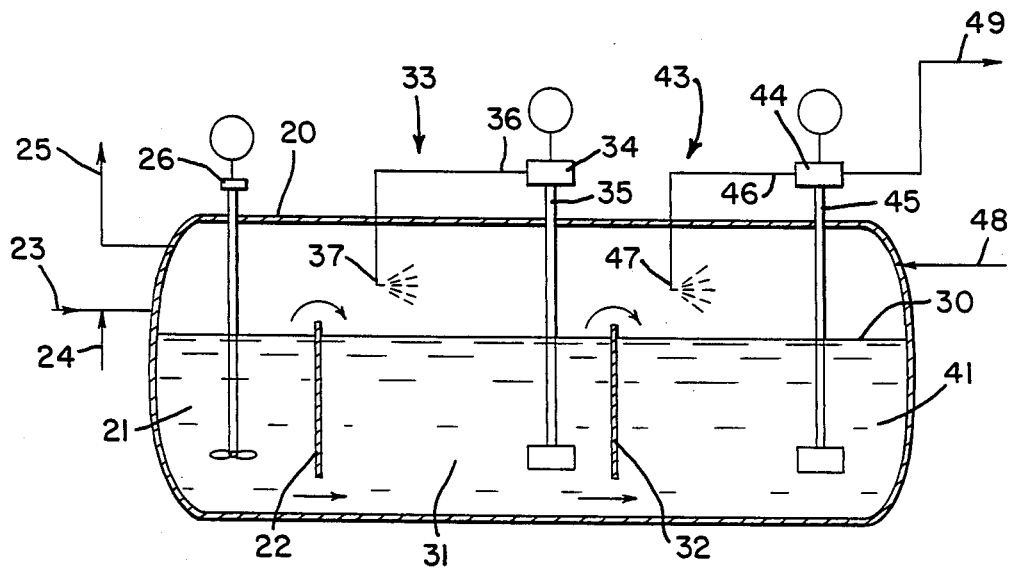
FIG. 2 is a diagrammatic representation of an embodiment of the invention comprising a mechanical mixing zone and two spray zones.

FIGS. 1 and 2 of the enclosed drawing diagrammatically show two devices that can be used for carrying out the process according to the invention.

The process according to the invention with atomization of the liquid sulfur containing the catalytic system can be carried out batchwise in an apparatus, as described in FIG. 1. The apparatus comprises a heat-insulated closed vessel 1, preferably a metal tank or reservoir divided into two compartments; a first compartment 2 of small volume and a second compartment 3 of large volume, by a partition 4 open at the upper part so as to form an overflow that allows the liquid sulfur to flow from the first to the second compartment. The bottom 5 of the first compartment is raised in relation to bottom 6 of the second compartment. The vessel is provided with an inlet 7 for sweeping gas that discharges into the first compartment above the level of the overflow and with an outlet 8 for sweeping gas provided in the upper part of the second compartment. The first compartment is provided with a conduit 9 for introduction of the liquid sulfur, said conduit being connected with line 10 for the addition of the catalytic system. Compartment 2 is equipped with mechanical agitation means 11, and the second compartment 3 is equipped with an atomization system 12 including a pump 13 with the inlet of suction conduit 14 near to a bottom of compartment 3 below the upper surface of the liquid sulfur and the discharge 15 is connected to an atomization nozzle 16 arranged in the second compartment so as to be situated above the upper surface 17 of the liquid sulfur contained in this compartment.

When carrying out the process in this manner, the liquid sulfur containing the catalytic system is subjected to vigorous agitation in the first compartment 2 which leads to a substantially homogeneous distribution of the catalytic system in the liquid sulfur contained in the compartment and to initiate the decomposition reaction of the sulphanes; then the mixture of liquid sulfur and catalytic system flows across the overflow 4 into the second compartment 3 in which said mixture is subjected to spraying or atomization. The $H_2S$ escaping from the mass of liquid sulfur contained in the two compartments is evacuated by circulation of the sweeping gas such as a residual gas of CLAUS sulfur plant and directed with said gas toward an incineration zone. The liquid sulfur is removed from the vessel 1 through line 51; the concentration of $H_2S$ and sulfanes in the liquid sulfur has reached the required level.

The process according to the invention with atomization of the liquid sulfur containing the catalytic system can be continuously carried out; for example, as shown in FIG. 2, by working in a heat-insulated closed vessel 20. The heat-insulated metal reservoir 20 is divided into at least three successive compartments namely, an inlet compartment 21, one or more intermediary compartments 31 and an outlet compartment 41, by parallel vertical partitions 22 and 32 which are open in the lower part to connect each one of the compartments with the adjacent compartments and which have a lesser height than the vessel so as to be able, should that be the case, to play the part of overflow for the liquid sulfur. The inlet compartment is provided with a conduit 23 for introducing the liquid sulfur. The conduit 23 is in fluid communication with conduit 24 for the addition of the catalytic system and in its upper part with an outlet 25 for a sweeping gas. Inlet compartment 21 is equipped with a mechanical agitation system 26. In addition, each one of the intermediary compartment(s) 31 and the outlet compartment 41 are equipped with an atomization or spraying system 33 and 43, said system including a pump 34 and 44 provided with suction conduits 35 and 45 having inlets below the level of liquid sulfur in the downstream part of the compartment concerned and, on the other hand, with discharge conduits 36 and 46 connected to atomization or spray nozzles 37 and 47 arranged in said compartment so as to be in the upstream portion of the compartment above the open surface 30 of the liquid sulfur it contains. The outlet compartment 41 is in addition provided with an inlet 48 for a sweeping gas arranged above the open surface 30 of the liquid sulfur. Further the pump of the atomization system includes a conduit 49 for removing the treated liquid sulfur.

When carrying out the process, the liquid sulfur, to which the catalytic system has been added, continuously enters the inlet compartment 21 and is there subjected to vigorous agitation which mixes the catalytic system with the liquid sulfur contained in the compartment 21. The catalytic decomposition reaction of the sulfanes is initiated. The mixture of the liquid sulfur and the catalytic system then continuously and successively flows into the intermediary compartment(s) 31, then into the outlet compartment 41 in each one of which the mixture is subjected to an atomization or spraying. The $H_2S$ escaping from the mass of liquid sulfur contained in the different compartments is continuously carried from the vessel mixed with the sweeping gas which can be a residual gas from a CLAUS sulfur plant. The gas is injected into the outlet compartment 41 and circulates above the open surface 30 of the liquid sulfur in a countercurrent flow, the gas leaves the vessel by the outlet 25 provided for this purpose in the inlet compartment 21. The sweeping gas loaded with $H_2S$ is then directed to an incineration zone. The treated liquid sulfur is continuously drawn off through the conduit 49 arranged to communicate with pump 44 of the atomization system 43. The level of sulfur in vessel 20 can be controlled by a level control means and control value in line 49, not shown.

By way of variation, the operation of atomization of the mixture of liquid sulfur and catalytic system provided when the process is carried out discontinuously and at least one of the spraying operations provided when the process is carried out continuously can be replaced by a stripping operation of the $H_2S$ by means of an inert gas injected into the liquid sulfur contained in the compartment(s) concerned of the processing vessel. In the device of FIG. 1, the compartment 2 can be eliminated, the liquid sulfur and the catalytic system being directly introduced in the compartment 3 that constitutes then the only compartment of the vessel.

The invention is illustrated by the non-limiting examples that follow:

EXAMPLES 1 TO 11

In these examples, the $H_2S$ contained in the liquid sulfur originating from a CLAUS sulfur unit was eliminated by working either in the presence of ammonia as the catalytic system (control Example 1) or in the presence of a catalytic system according to the invention.

The work was carried out in a glass flask kept at constant temperature in a thermostatically controlled oil bath. The flask was provided with a first glass dip tube for introducing a stripping gas into the liquid sulfur, with a second glass tube for introducing a sweeping gas into the flask, the end of said tube being situated about two centimeters above the open surface of the liquid sulfur, and with a third pipe for injection of the catalyst and removal of samples of liquid sulfur; the flasks had an outlet for the gases that pass the gases to a trapping system for the $H_2S$.

In the flask were placed 1,000 g of liquid sulfur. The sulfur was collected at the sulfur recovery unit condenser. The sulfur was kept at the selected temperature. At the beginning of the process, there were introduced in the flask through the dip tube, 100 1/h of a stripping gas; nitrogen (Examples 1, 7 and 5); or air (the other examples) and through the sweeping tube, 120 1/h of air as sweeping gas. Through the appropriated conduit there were evacuated 220 1/h of a gaseous effluent that was passed to the trapping system for the H₂S. At defined intervals, samples of liquid sulfur were removed and the H₂S and the sulfanes that it still contained were determined by iodometry or argentimetry. The end point of the reaction was detected by potentiometry at an accuracy of bimetallic electrodes.

The result of the determination designated by "total H₂S" represented the sum of the contents of liquid sulfur respectively of simply dissolved free H₂S and of H₂S combined in the form of sulfanes.

In control Example 1, there were effected two injections of 25 ppm ammonia into the liquid sulfur by addition to the stripping gas; the first one at the beginning of the process and the second at the end of one hour. In the other examples, the catalytic system was added to the contents of the flask at the beginning of the process in the form of a solution in a small quantity of liquid sulfur. This addition was effected through the pipe serving for removal of the samples of liquid sulfur.

The specific conditions of operation of the different examples and the results obtained are shown in Table I.

TABLE 1

| EXAMPLE | CATALYTIC SYSTEM (Nature & Quantity) | TREATMENT Temperature (°C.) | Duration (min.) | "H₂S TOTAL" CONTENT OF THE LIQUID SULFUR (ppm) |
|---|---|---|---|---|
| 1 (control) | NH₃ 2 × 25 ppm | 140 | 0 | 465 |
|  |  |  | 60 | 284 |
|  |  |  | 120 | 132 |
|  |  |  | 240 | 18 |
|  |  |  | 300 | 9.5 |
| 2 | Quinoline 92 ppm | 135 | 0 | 511 |
|  |  |  | 12 | 80 |
|  |  |  | 24 | 27 |
|  |  |  | 38 | 6 |
|  |  |  | 48 | <2 |
| 3 | Quinoline 98 ppm | 150 | 0 | 534 |
|  |  |  | 12 | 150 |
|  |  |  | 22 | .77 |
|  |  |  | 40 | 24 |
|  |  |  | 50 | 10 |
|  |  |  | 80 | <2 |
| 4 | Quinoline 100 ppm | 165 | 0 | 430 |
|  |  |  | 12 | 189 |
|  |  |  | 35 | 90 |
|  |  |  | 62 | 71 |
|  |  |  | 135 | 32 |
|  |  |  | 200 | 10 |
| 5 | Quinoline 90 ppm | 150 | 0 | 489 |
|  |  |  | 10 | 156 |
|  |  |  | 30 | 30 |
|  |  |  | 52 | 10 |
|  |  |  | 80 | <2 |
| 6 | Isoquinoline 89 ppm | 150 | 0 | 509 |
|  |  |  | 15 | 51 |
|  |  |  | 28 | 21 |
|  |  |  | 45 | 5 |
|  |  |  | 50 | <2 |
| 7 | Phenantridine 41 ppm | 150 | 0 | 340 |
|  |  |  | 10 | 132 |
|  |  |  | 26 | 44 |
|  |  |  | 40 | 32 |
|  |  |  | 74 | 10 |
|  |  |  | 108 | <2 |
| 8 | o. Phenantroline 8 ppm | 150 | 0 | 543 |
|  |  |  | 7 | 109 |
|  |  |  | 20 | 17 |
|  |  |  | 35 | <2 |
| 9 | o. Phenantroline 56 ppm | 150 | 0 | 298 |
|  |  |  | 8 | 16 |
|  |  |  | 15 | <2 |
| 10 | Bipyridyl-2,2' 85 ppm | 150 | 0 | 432 |
|  |  |  | 15 | 290 |
|  |  |  | 70 | 37 |
|  |  |  | 108 | 10 |
|  |  |  | 150 | <2 |
| 11 | 1,8-Naphtyridine 80 ppm | 150 | 0 | 583 |
|  |  |  | 6 | 220 |
|  |  |  | 20 | 49 |
|  |  |  | 40 | 7.5 |

A comparison of the results of Examples 2 to 11 with those of control Example 1 demonstrates the effectiveness of the catalytic systems according to the invention which make it possible to obtain "total H₂S" contents in the liquid sulfur below 10 ppm at the end of a duration of treatment substantially shorter than that needed when using a conventional basic catalyst such as ammonia.

In the process of the present invention, the $H_2S$ may be stripped from the liquid sulfur by countercurrent contact with a gas by a gas contact means. The gas contact means can be a packed, a tray or an open column.

What is claimed is:

1. In a process for the removal of $H_2S$ present in liquid sulfur in a simply dissolved state and in a combined state as hydrogen polysulfides wherein a catalyst system containing at least one basic compound is admixed with the liquid sulfur and the $H_2S$ is separated from the liquid sulfur maintained at an elevated temperature in a sulfur treating zone, the improvement which comprises: admixing with the liquid sulfur, a catalyst system consisting essentially of at least one compound selected from the group consisting of heterocyclic monocyclic compounds and heterocyclic polycyclic compounds containing at least one nitrogen heteroatom, soluble in the liquid sulfur, having a boiling point above 200° C. at atmospheric pressure and stable in the liquid sulfur at the elevated temperature.

2. In a process for the removal of $H_2S$ present in liquid sulfur in a simply dissolved state and in a combined state as hydrogen polysulfides wherein a catalyst system containing at least one basic compound is admixed with the liquid sulfur and the $H_2S$ is separated from the liquid sulfur maintained at an elevated temperature in a sulfur treating zone, the improvement which comprises: admixing with the liquid sulfur, a catalyst system consisting essentially of at least one compound selected from the group consisting of heterocyclic monocyclic compounds and heterocyclic polycyclic compounds containing at least one nitrogen heteroatom, and at least one additional heteroatom selected from the group consisting of oxygen and sulfur, and wherein said compound is soluble in the liquid sulfur, has a boiling point above 200° C. at atmospheric pressure and is stable in the liquid sulfur at the elevated temperature.

3. In a process for the removal of $H_2S$ present in liquid sulfur in a simply dissolved state and in a combined state as hydrogen polysulfides wherein a catalyst system containing at least one basic compound is admixed with the liquid sulfur and the $H_2S$ is separated from the liquid sulfur maintained at an elevated temperature in a sulfur treating zone, the improvement which comprises: admixing with the liquid sulfur, a catalyst system consisting essentially of at least one compound selected from the group consisting of heterocyclic monocyclic compounds and heterocyclic polycyclic compounds containing at least one nitrogen heteroatom, and wherein said compound comprises unsubstituted aromatic heterocyclic compounds and is soluble in the liquid sulfur, has a boiling point above 200° C. at atmospheric pressure and is stable in the liquid sulfur at the elevated temperature.

4. In a process for the removal of $H_2S$ present in liquid sulfur in a simply dissolved state and in a combined state as hydrogen polysulfides wherein a catalyst system containing at least one basic compound is admixed with the liquid sulfur and the $H_2S$ is separated from the liquid sulfur maintained at an elevated temperature in a sulfur treating zone, the improvement which comprises: admixing with the liquid sulfur, a catalyst system consisting essentially of at least one compound selected from the group consisting of heterocyclic monocyclic compounds and heterocyclic polycyclic compounds containing at least one nitrogen heteroatom, and wherein said compound is comprised of at least one cyclic moiety containing not more than one heteroatom and is soluble in the liquid sulfur, has a boiling point above 200° C. at atmospheric pressure and is stable in the liquid sulfur at the elevated temperature.

5. The process of claim 1 wherein the catalytic system is added to the liquid sulfur in an amount of from about 5 to 120 ppm by weight of the sulfur.

6. The process of claim 1 wherein the elevated temperature is a temperature in the range of from about 125 to about 180° C.

7. The process of claim 6 wherein the elevated temperature is a temperature in the range of from about 130° C. to about 165° C.

8. The process of claim 1 wherein the liquid sulfur admixed with the catalyst system is agitated.

9. The process of claim 8 wherein the agitation is carried out by mechanical means.

10. The process of claim 1 wherein the liquid sulfur admixed with the catalyst system is agitated by means of injection of an inert gas into the liquid sulfur.

11. The process of claim 1 wherein the liquid sulfur admixed with the catalyst system is sprayed into an inert gas.

12. The process of claim 1 wherein the sulfur in the sulfur treating zone has an open surface and the open surface is swept by a gas that is inert under the conditions of operation.

13. The process of claim 2 wherein the catalytic system is added to the liquid sulfur in an amount of from about 5 to 120 ppm by weight of the sulfur.

14. The process of claim 2 wherein the elevated temperature is a temperature in the range of from about 125 to about 180° C.

15. The process of claim 14 wherein the elevated temperature is a temperature in the range of from about 130° C. to about 165° C.

16. The process of claim 2 wherein the liquid sulfur admixed with the catalyst system is agitated.

17. The process of claim 16 wherein the agitation is carried out by mechanical means.

18. The process of claim 2 wherein the liquid sulfur admixed with the catalyst system is agitated by means of injection of an inert gas into the liquid sulfur.

19. The process of claim 2 wherein the liquid sulfur admixed with the catalyst system is sprayed into an inert gas.

20. The process of claim 2 wherein the sulfur in the sulfur treating zone has an open surface and the open surface is swept by a gas that is inert under the conditions of operation.

21. The process of claim 3 wherein the catalytic system is added to the liquid sulfur in an amount of from about 5 to 120 ppm by weight of the sulfur.

22. The process of claim 3 wherein the elevated temperature is a temperature in the range of from about 125 to about 180° C.

23. The process of claim 2 wherein the elevated temperature is a temperature in the range of from about 130° C. to about 165° C.

24. The process of claim 3 wherein the liquid sulfur admixed with the catalyst system is agitated.

25. The process of claim 24 wherein the agitation is carried out by mechanical means.

26. The process of claim 3 wherein the liquid sulfur admixed with the catalyst system is agitated by means of injection of an inert gas into the liquid sulfur.

27. The process of claim 3 wherein the liquid sulfur admixed with the catalyst system is sprayed into an inert gas.

28. The process of claim 3 wherein the sulfur in the sulfur treating zone has an open surface and the open surface is swept by a gas that is inert under the conditions of operation.

29. The process of claim 3 wherein the catalyst system consists essentially of at least one compound selected from the group consisting of quinoline, isoquinoline, benzoquinoline, acridine, benzacridine, quinoxaline, quinazoline, phenazine, phenantridine, phenantrolines, naphthyridines, and bipyridyls.

30. The process of claim 24 wherein the catalytic system is added to the liquid sulfur in an amount of from about 5 to 120 ppm by weight of the sulfur.

31. The process of claim 4 wherein the elevated temperature is a temperature in the range of from about 125 to about 180° C.

32. The process of claim 31 wherein the elevated temperature is a temperature in the range of from about 130° C. to about 165° C.

33. The process of claim 4 wherein the liquid sulfur admixed with the catalyst system is agitated.

34. The process of claim 33 wherein the agitation is carried out by mechanical means.

35. The process of claim 4 wherein the liquid sulfur admixed with the catalyst system is agitated by means of injection of an inert gas into the liquid sulfur.

36. The process of claim 4 wherein the liquid sulfur admixed with the catalyst system is sprayed into an inert gas.

37. The process of claim 4 wherein the sulfur in the sulfur treating zone has an open surface and the open surface is swept by a gas that is inert under the conditions of operation.

38. The process of claim 4 wherein the polycyclic compound comprises at least two cyclic moieties wherein each cyclic moiety contains not more than one heteroatom.

39. The process of claim 4 wherein the heterocyclic monocyclic compounds and the heterocyclic polycyclic compounds are aromatic compounds.

40. The process of claim 4 wherein the heterocyclic polycyclic compounds comprise at least two adjacent cyclic moieties, each containing a single nitrogen heteroatom wherein the nitrogen heteroatoms are separated from each other by not more than three carbon atoms.

* * * * *